US012733013B2

(12) United States Patent
Nagano et al.

(10) Patent No.: US 12,733,013 B2
(45) Date of Patent: Sep. 8, 2026

(54) TERMINAL, BASE STATION AND WIRELESS COMMUNICATION METHOD FOR RADIO RESOURCE CONTROL (RRC)

(71) Applicants: DENSO CORPORATION, Kariya-city (JP); TOYOTA JIDOSHA KABUSHIKI KAISHA, Toyota (JP)

(72) Inventors: Tatsuki Nagano, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 18/457,278

(22) Filed: Aug. 28, 2023

(65) Prior Publication Data

US 2023/0403724 A1 Dec. 14, 2023

Related U.S. Application Data

(63) Continuation of application No. PCT/JP2022/012186, filed on Mar. 17, 2022.

(30) Foreign Application Priority Data

Mar. 25, 2021 (JP) ................................ 2021-052281

(51) Int. Cl.
*H04W 72/232* (2023.01)
*H04L 5/00* (2006.01)
*H04W 72/1273* (2023.01)

(52) U.S. Cl.
CPC ......... *H04W 72/232* (2023.01); *H04L 5/0048* (2013.01); *H04W 72/1273* (2013.01)

(58) Field of Classification Search
CPC .......... H04W 72/232; H04W 72/1273; H04W 48/08; H04W 76/27; H04L 5/0048
See application file for complete search history.

(56) References Cited

U.S. PATENT DOCUMENTS

| | | | | |
|---|---|---|---|---|
| 11,910,463 | B2 * | 2/2024 | Hwang | H04W 68/005 |
| 12,267,269 | B2 * | 4/2025 | Chen | H04L 5/0051 |
| 12,368,621 | B2 * | 7/2025 | Ye | H04W 68/005 |

(Continued)

OTHER PUBLICATIONS

3GPP TS 38.300 V15.2.0 (Jun. 2018).

(Continued)

*Primary Examiner* — Hoang-Chuong Q Vu
(74) *Attorney, Agent, or Firm* — Harness, Dickey & Pierce, P.L.C.

(57) ABSTRACT

A terminal includes: a receiving unit configured to: receive system information including information used for configuring a resource for a reference signal for tracking and receive on a physical downlink control channel, downlink control information used for scheduling of a physical downlink shared channel; and a control unit configured to: use, in an idle state or an inactive state, the resource for the reference signal for tracking, the resource being configured based on the information used for configuring the resource for the reference signal for tracking, and control, in a connected state, reception of the physical downlink shared channel such that the resource configured based on the information used for configuring the resource for the reference signal for tracking is ignored.

15 Claims, 11 Drawing Sheets

(56) References Cited

U.S. PATENT DOCUMENTS

2021/0321330 A1* 10/2021 Ang .................. H04W 72/1273
2022/0225237 A1* 7/2022 He .................... H04W 72/0446
2023/0336298 A1* 10/2023 Wagner ................. H04L 5/0048
2024/0163052 A1* 5/2024 Li ......................... H04L 5/0051
2024/0163846 A1* 5/2024 Sheng ................. H04W 68/025
2024/0223334 A1* 7/2024 Hwang ................. H04W 68/00
2025/0071799 A1* 2/2025 Abedini .............. H04W 72/563
2025/0267578 A1* 8/2025 Zhang ............... H04W 52/0229

OTHER PUBLICATIONS

CATT, Configuration of TRS/CSI-RS for paging enhancement[online], 3GPP TSG RAN WG1 #104-e R1-2100393,Jan. 19, 2021, section 2.3.
NTT Docomo, Inc., Discussion on TRS/CSI-RS occasion for idle/ inactive UEs[online], 3GPP TSG RAN WGI #104e R1-2101623, Jan. 19, 2021, Section 2.1.
3GPP TS 38.212, V16.4.0 (Dec. 2020), 3rd Generation Partnership Project; Technical Specification Group Radio Access Network; NR; Multiplexing and channel coding (Release 16), pp. 1-152.
3GPP TSG RAN WG1 #104-e, R1-2100904, e-Meeting, Jan. 25-Feb. 5, 2021, LG Electronics, Discussion on TRS/CSI-RS occasion(s) for idle/inactive UEs, pp. 1-6.
Sony, “Discussion on TRS/CSI-RS Configuration of Idle/Inactive-Mode UEs”, Document R2-2100912, 3GPP TSG RAN WG2 Meeting #113-e, Jan. 25-Feb. 5, 2021.
3GPP TSG RAN WG1, Meeting #102-E, R1-2005885, e-Meeting, Aug. 17-28, 2020, Intel Corporation, Discussion on TRS/CSI-RS reception during idle/inactive mode, pp. 1-2.

* cited by examiner

CORE NETWORK
BASE STATION
UL SIGNAL
DL SIGNAL
10
20
30
C

FREQUENCY
SUBCARRIER
#11 #10 #9 #8 #7 #6 #5 #4 #3 #2 #1 #0
1RB
#0
#1
#2
#3
TIME
SYMBOL
#0 #1 #2 #3 #4 #5 #6 #7 #8 #9 #10 #11 #12 #13
SLOT #n
SLOT #n+1
TRS CYCLE
SPECIFIC TRS RESOURCE (NZP-CSI-RS RESOURCES #0 TO #3)

TIME
PO
TRS
LS
SSB
LS
SSB
DS
PAGING CYCLE
PO (B)

TIME
PO'
TRS
LS
SSB
SSB
DS
PAGING CYCLE
PO

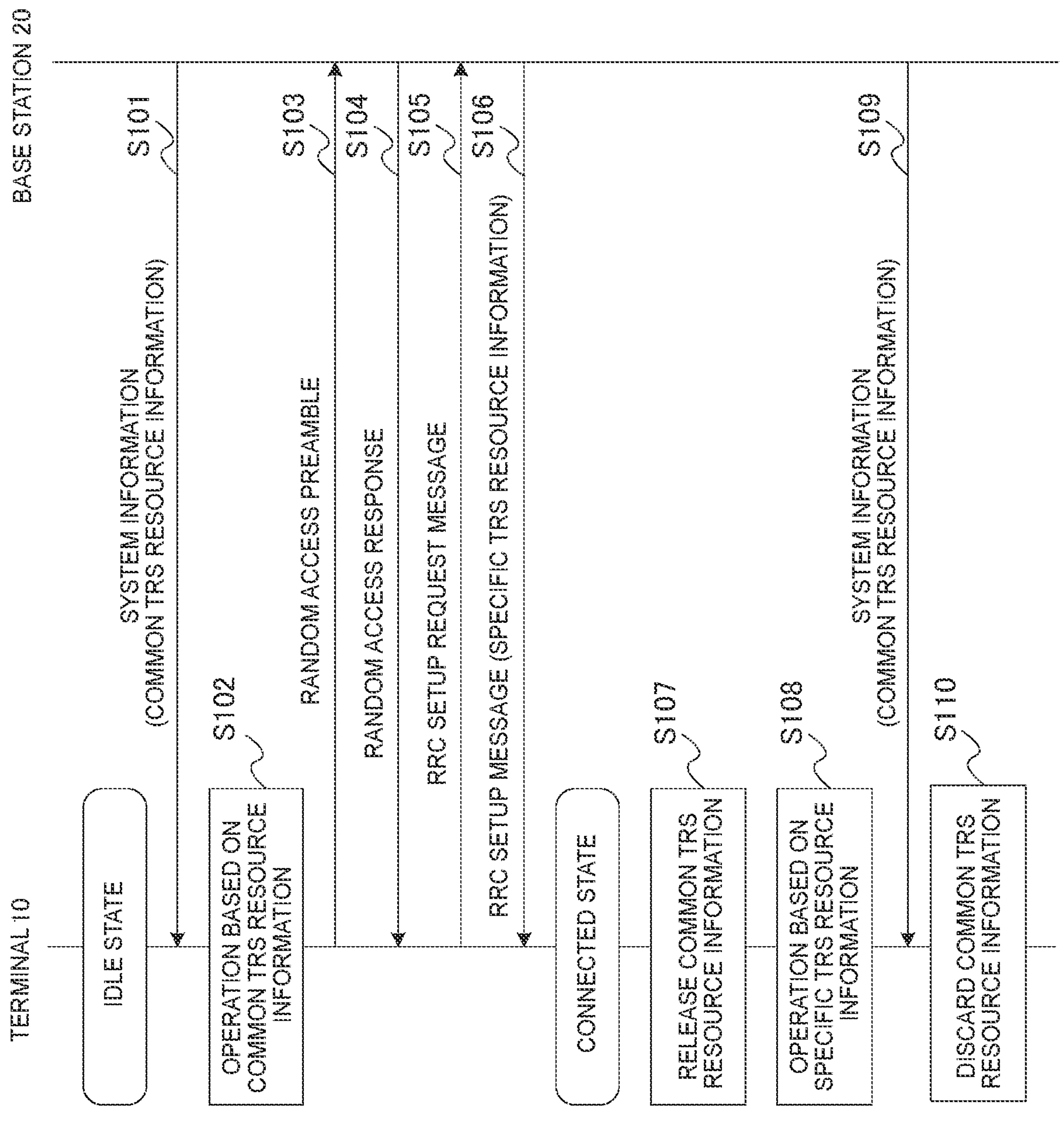
Fig. 6
TERMINAL 10
BASE STATION 20
IDLE STATE
SYSTEM INFORMATION
(COMMON TRS RESOURCE INFORMATION)
S101
OPERATION BASED ON COMMON TRS RESOURCE INFORMATION
S102
RANDOM ACCESS PREAMBLE
S103
RANDOM ACCESS RESPONSE
S104
RRC SETUP REQUEST MESSAGE
S105
RRC SETUP MESSAGE (SPECIFIC TRS RESOURCE INFORMATION)
S106
CONNECTED STATE
RELEASE COMMON TRS RESOURCE INFORMATION
S107
OPERATION BASED ON SPECIFIC TRS RESOURCE INFORMATION
S108
SYSTEM INFORMATION
(COMMON TRS RESOURCE INFORMATION)
S109
DISCARD COMMON TRS RESOURCE INFORMATION
S110

Fig. 8

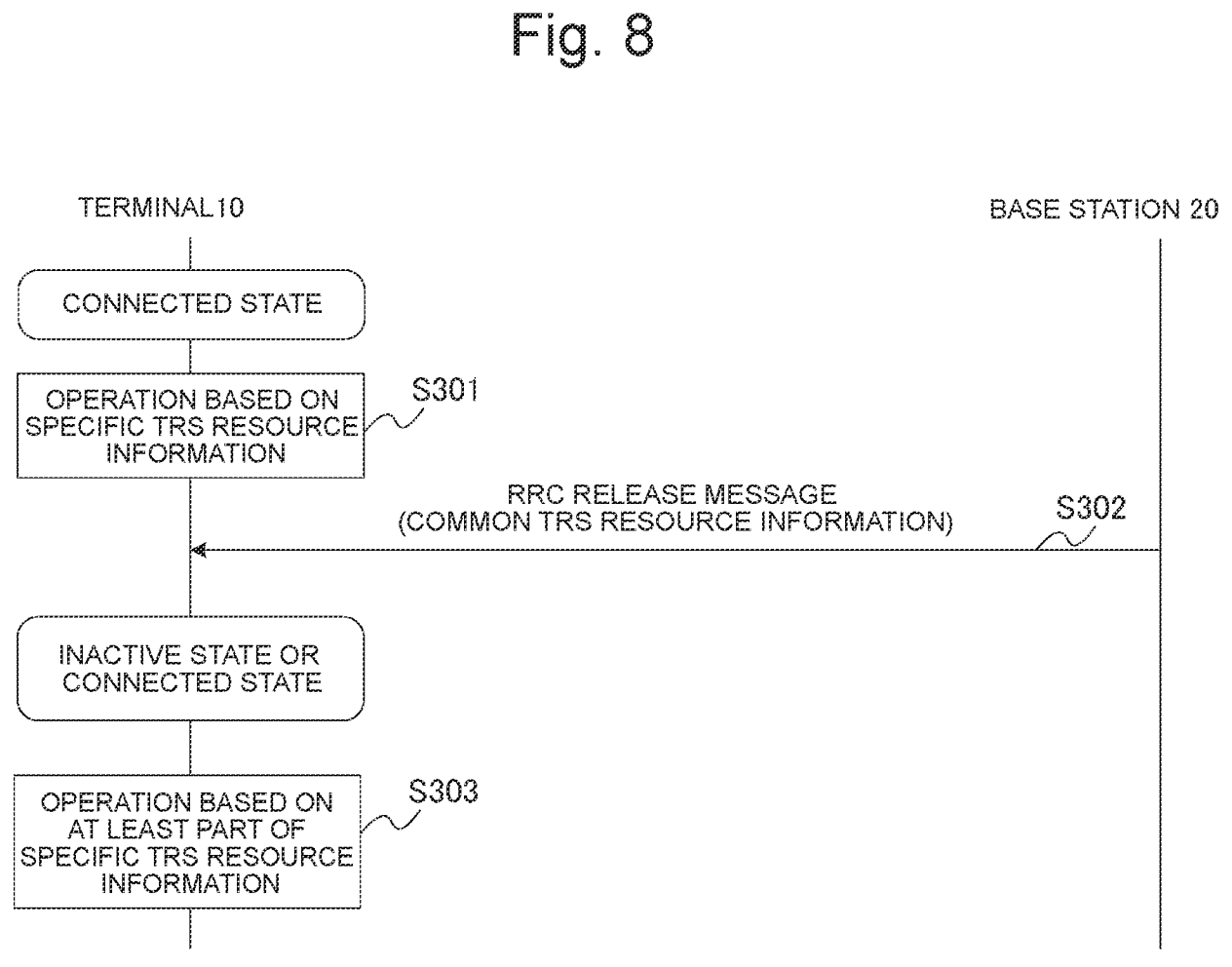

TERMINAL10

BASE STATION 20

CONNECTED STATE

OPERATION BASED ON SPECIFIC TRS RESOURCE INFORMATION

S301

RRC RELEASE MESSAGE (COMMON TRS RESOURCE INFORMATION)

S302

INACTIVE STATE OR CONNECTED STATE

OPERATION BASED ON AT LEAST PART OF SPECIFIC TRS RESOURCE INFORMATION

S303

TERMINAL, BASE STATION AND WIRELESS COMMUNICATION METHOD FOR RADIO RESOURCE CONTROL (RRC)

CROSS-REFERENCE TO RELATED APPLICATIONS

This application is a continuation application of International Patent Application No. PCT/JP2022/012186, filed Mar. 17, 2022, which designated the U.S. and claims the benefit of priority from Japanese Patent Application No. 2021-052281, filed Mar. 25, 2021. The entire disclosures of the above applications are incorporated herein by reference.

TECHNICAL FIELD

This disclosure relates to a terminal and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.2.0 (2018-06).

In NR, for a terminal in a connected state, a reference signal for tracking (hereinafter referred to as "Tracking Reference Signal (TRS)"), configured to be specific to the terminal, is supported.

SUMMARY

Currently, in the 3GPP, for a terminal in an idle state or an inactive state, a TRS configured to be common to one or more terminals (for example, terminals in a cell) is considered to be supported. However, in a case where the TRS for the terminal in the idle state or the inactive state is supported, the terminal might not be able to control communication appropriately. For example, the terminal transitioning from the idle state or the inactive state to the connected state might not be able to control an operation using the TRS for the connected state appropriately.

An object of this disclosure is to provide a terminal and a wireless communication method capable of controlling communication appropriately in a case where a TRS for a terminal in an idle state or in an inactive state is supported.

A terminal according to one aspect of this disclosure includes: a receiving unit which receives first configuration information and second configuration information related to a reference signal for tracking; and a control unit which configures a resource for the reference signal based on the first configuration information, the resource being used in a connected state, and which configures a resource for the reference signal based on the second configuration information, the resource being used in an idle state or an inactive state.

With one aspect of this disclosure, it is possible to control communication appropriately in a case where a TRS for a terminal in an idle state or an inactive state is supported.

BRIEF DESCRIPTION OF DRAWINGS

FIG. 4(A) and FIG. 4(B) are diagrams each illustrating an example of the use of a TRS for a terminal 10 in an idle state or an inactive state according to the present embodiment.

FIG. 6 is a diagram illustrating an example of a first TRS resource control according to the present embodiment.

FIG. 8 is a view illustrating further another example of the first TRS resource control according to the present embodiment.

DETAILED DESCRIPTION

An embodiment of this disclosure will be described with reference to the accompanying drawings. Note that, in each figure, members having the same reference sign have the same or similar configuration.

Figure 1:
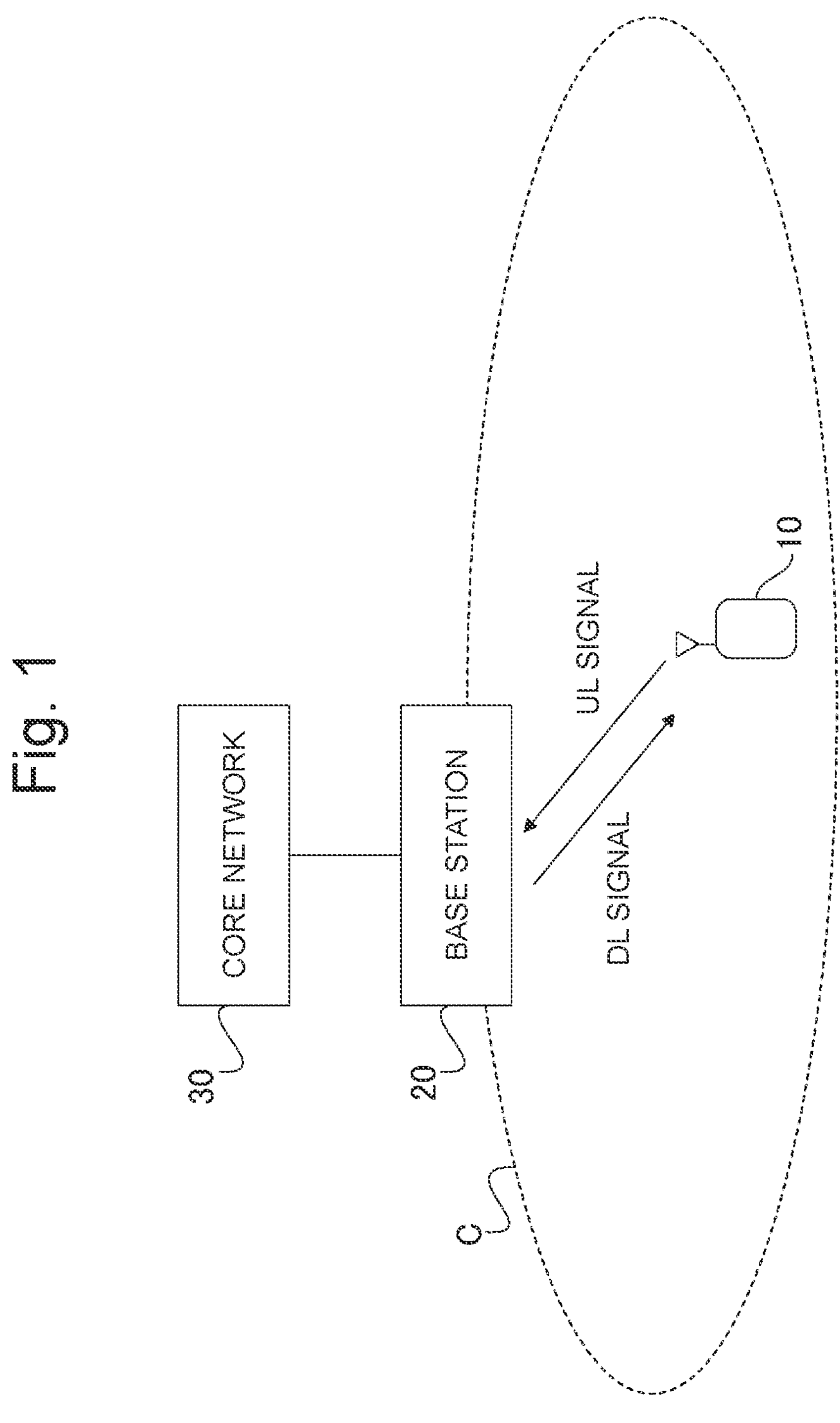
FIG. 1 is a diagram illustrating an example of the overview of a wireless communication system according to the present embodiment.

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 and base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs such as the 6th generation (6G) RAT or later can be utilized.

The terminal 10 is a given terminal or equipment such as a smartphone, a personal computer, an in-vehicle terminal, an in-vehicle device, a stationary device, or a telematics control unit (TCU), for example. The terminal 10 may also be called User Equipment (UE), a Mobile Station (MS), a terminal (User Terminal), a radio apparatus, a subscriber terminal, an access terminal, or the like. The terminal 10 may be of a mobile type or a fixed type. The terminal 10 is configured communicably using NR as RAT, for example.

The base station 20 forms one or more cells C to communicate with the terminal 10 using each of the cells C. The cell C may also be mutually rephrased as a serving cell, a carrier, a component carrier (CC), and the like. For example, the base station 20 may configure one primary cell and one or more secondary cells for the terminal 10 and communicate with the terminal 10 (also called carrier aggregation). That is, the one or more cells C include at least a primary cell and may include a secondary cell.

The base station 20 may also be called a gNodeB (gNB), an en-gNB, a Next Generation-Radio Access Network (NG-RAN) node, a low-power node, a Central Unit (CU), a Distributed Unit (DU), a gNB-DU, a Remote Radio Head (RRH), an Integrated Access and Backhaul/Backhauling (IAB) node, or the like. The base station 20 is not limited to one node and may be constituted by a plurality of nodes (for example, a combination of a lower node such as a DU and an upper node such as a CU).

The core network 30 is, for example, an NR-compatible core network (5G Core Network: 5GC), but the core network 30 is not limited thereto. A device on the core network 30 (hereinafter also be referred to as a "core network device") performs mobility management such as paging and location registration of the terminal 10. The core network device may be connected to the base station 20 through a given interface (for example, S1 or NG interface).

The core network device may include, for example, at least one of Access and Mobility Management Function (AMF) for managing C-plane information (e.g., information related to access, mobility management, and the like), and User Plane Function (UPF) for transmission control of U-plane information (e.g., user data).

In the wireless communication system 1, the terminal 10 receives a downlink (DL) signal from the base station 20 and/or transmits an uplink (UL) signal. In the terminal 10, one or more carriers may be configured. The bandwidth of each carrier is, for example, in a range of 5 MHz to 400 MHz. One or more bandwidth parts (BWPs) may be configured on one carrier. One BWP has at least part of the bandwidth of the carrier. That is, one or more BWPs may be configured in each of the one or more cells C configured in the terminal 10. For example, in the terminal 10, up to four BWPs may be configured in one cell C.

One or more Control Resource Sets (CORESETs) may be configured in one BWP. The CORESET is a resource of a time domain and a frequency domain for a downlink control channel (e.g., Physical Downlink Control Channel: PDCCH). For example, the CORESET is configured by a given number of symbols (e.g., one to three symbols) and a given number of Resource Blocks (RBs) (e.g., 6n ($n \geq 1$) RBs). Note that the downlink control channel is not limited to the PDCCH, but the downlink control channel needs only to be a channel used for transmission of Downlink Control Information (DCI), and the name is not limited.

Here, one or more formats may be defined for transmission of DCI. A format defined for transmission of DCI is called a DCI format. For example, a DCI format (also referred to as downlink assignment, DCI format 1_x (x=0, 1, 2, or the like), or the like) used for scheduling of a downlink shared channel (e.g., Physical Downlink Shared Channel: PDSCH) may be defined. Further, a DCI format (also referred to as uplink grant, DCI format 0_x (x=0, 1, 2, or the like), or the like) used for scheduling of an uplink shared channel (e.g., Physical Uplink Shared Channel: PUSCH) may be defined.

Note that the downlink shared channel and the uplink shared channel are not limited to the PDSCH and the PUSCH, respectively, but the downlink shared channel and the uplink shared channel need only to be channels used for transmission of control information (e.g., Medium Access Control Control Element (MAC CE), a Radio Resource Control (RRC) message, and the like) on user data and/or a layer superior than a physical layer, and their names are not limited. The names of other channels are also not limited, provided that they are channels having similar functions. The terminal 10 controls reception of the PDSCH based on the DCI.

Further, the terminal 10 detects a synchronization signal (e.g., Primary Synchronization Signal (PSS) and/or Secondary Synchronization Signal (PSS)) from the base station 20 and acquires synchronization of time and frequency in the cell C. A block including a synchronization signal, a broadcast channel (e.g., Physical Broadcast Channel: PBCH), and a Demodulation Reference Signal (DMRS) for the broadcast channel is also called a Synchronization Signal Block (SSB), a SS/PBCH block, or the like. The SSB is provided at a given cycle.

UE State

Figure 2:
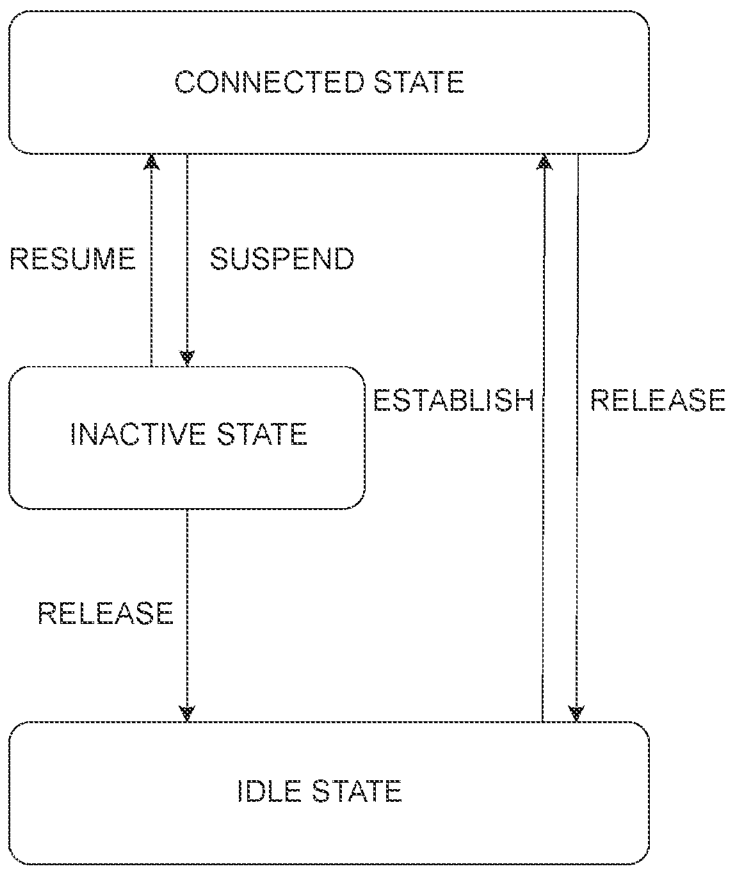
FIG. 2 is a diagram illustrating an example of state transition of a terminal according to the present embodiment.

Next will be described the state of the terminal 10. The state of the terminal 10 includes an idle state, an inactive state, and a connected state and is also called an RRC state or the like. FIG. 2 is a diagram illustrating an example of transition of the state of the terminal 10. In FIG. 2, the idle state is a state where RCC connection between the terminal 10 and the base station 20 is not established and is also called RRC_IDLE, an idle mode, an RRC idle mode, or the like.

The terminal 10 in the idle state camps on a cell C selected by cell selection and/or cell reselection (hereinafter referred to as "cell selection/reselection") and receives system information broadcast in the cell C. Here, the expression "camp on the cell C" may be rephrased as the expression "exist in the cell C" or the like. Further, the terminal 10 in the idle state performs monitoring of paging in a given period of a given cycle (e.g., Paging Occasion (PO)), Discontinuous Reception (DRX) configured by Non Access Stratum (NAS), and the like. When the RRC connection is established, the terminal 10 in the idle state transitions to the connected state.

The inactive state is a state where the RRC connection is established but is suspended and is also called an RRC_INACTIVE state, an inactive mode, an RRC inactive mode, or the like. The terminal 10 in the inactive state camps on a cell C selected by cell selection/reselection and receives system information broadcast in the cell C. Further, the terminal 10 in the inactive state performs monitoring of paging in a given period of a given cycle (e.g., PO), DRX configured by NAS or RRC, and the like. When the RRC connection is resumed, the terminal 10 in the inactive state transitions to the connected state.

The connected state is a state where the RRC connection is established and is also called an RRC_CONNECTED state, a connected mode, an RRC connected mode, and the like. The terminal 10 in the connected state monitors the PDCCH and controls reception of the PDSCH based on detected DCI. When the RRC connection is released, the terminal 10 in the connected state transitions to the idle state, and when the RRC connection is suspended, the terminal 10 in the connected state transitions to the inactive state.

TRS of Connected State

The terminal 10 in the connected state needs to perform tracking to receive a PDSCH. Here, tracking means tracking and/or compensating time and/or frequency variations of a local oscillator of the terminal 10. A TRS is a reference signal for the tracking. Note that the TRS may be used for estimation of path delay spread, Doppler spread, and the like, for example, as well as tracking.

The TRS may be a Channel State Information-Reference Signal (CSI-RS) but is not limited to this, and the TRS may be any reference signal used for the tracking. The TRS may be rephrased as a CSI-RS for tracking, a Non zero power-CSI-RS (NZP-CSI-RS), a TRS/CSI-RS, or the like.

A resource for such a TRS (hereinafter referred to as "TRS resource") may be constituted by, for example, a set (hereinafter referred to as "NZP-CSI-RS resource set") of one or more resources for the NZP-CSI-RS (hereinafter referred to as "NZP-CSI-RS resource"). The TRS resource may be constituted by a given number of symbols and a given number of subcarriers in a given number of slots with a given cycle (hereinafter referred to as "TRS cycle", e.g., a cycle of 10, 20, 40, or 80 ms). The period of the given cycle (e.g., the given number of slots) including the TRS resource is also called TRS occasion, TRS/CSI-RS occasion, or the like.

For example, the base station 20 may configure a period for the given cycle including the TRS resource and specify availability of the TRS during the period of the given cycle. That is, the base station 20 may instruct whether or not the TRS is actually transmitted to the terminal 10 in the TRS resource thus configured. For example, the base station 20 may transmit information on whether the TRS is available or not (also called information indicative of whether the TRS exists or not), with the information being included in a DCI format. For example, the information indicative of whether the TRS is available or not may be included in a DCI format (e.g., downlink assignment) to which CRC (also called Cyclic Redundancy Check or CRC parity bit) scrambled by a given identifier (e.g., Paging radio network temporary identifier (P-RNTI)) is attached. Further, the information indicative of whether the TRS is available or not may be transmitted together with information indicative of whether or not the terminal 10 monitors a DCI format (e.g., downlink assignment) to which CRC scrambled by P-RNTI is attached (e.g., information indicative of whether the terminal 10 is paged, also called paging early indication).

Thus, the TRS resource may be controlled based on an upper layer parameter (e.g., an RRC parameter and/or MAC CE, and the like) and/or a physical layer parameter (e.g., a DCI format, and the like). The configuration of the TRS resource can be rephrased as the configuration of TRS occasion. Further, the configuration of the TRS resource can be rephrased as the configuration of TRS/CSI-RS occasion.

The terminal 10 may configure the TRS resource based on information (hereinafter referred to as "specific TRS resource information") related to the configuration of a TRS resource (hereinafter referred to as "specific TRS resource") specific to the terminal 10 from the base station 20. The specific TRS resource information can be rephrased as first configuration information specific to the terminal 10 about the TRS. Thus, the specific TRS resource information is a parameter specific to the terminal 10 about the configuration of the TRS resource. For example, the configuration of the specific TRS resource may be associated with each of one or more BWPs. That is, the specific TRS resource may be configured for each of one or more BWPs. For example, information (bwp-id) to be used to identify one BWP may be included in the specific TRS resource information, and the one BWP may be associated with the configuration of one specific TRS resource. Here, a value for the information (bwp-id) used to identify the one BWP may be "0 (indicative of Initial Downlink BWP, for example)" and/or "other than 0 (indicative of Active Downlink BWP, for example)."

Figure 3:
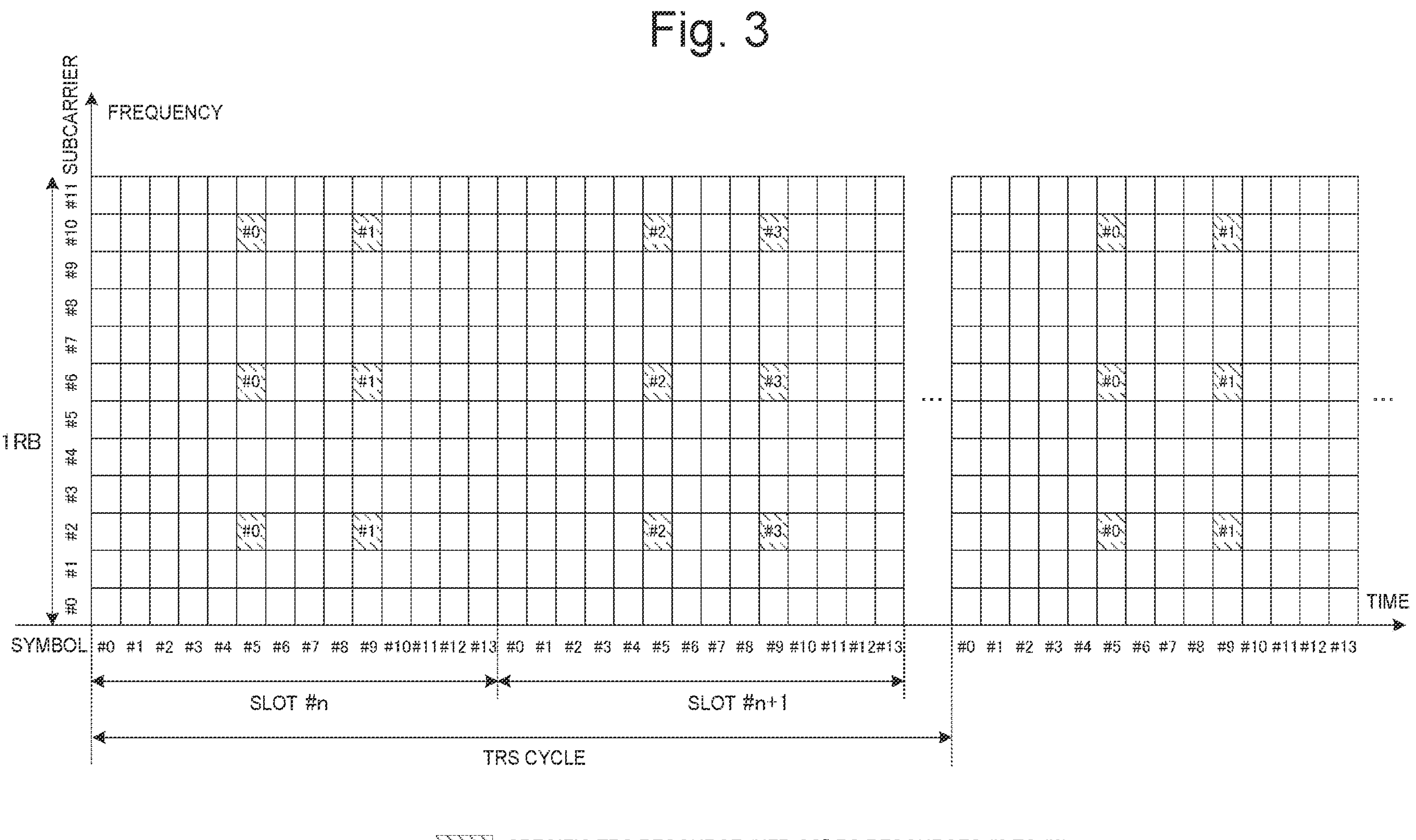
FIG. 3 is a diagram illustrating an example of the configuration of specific TRS resources according to the present embodiment.

FIG. 3 is a diagram illustrating an example of the configuration of a specific TRS resource according to the present embodiment. For example, FIG. 3 illustrates an example using an NZP-CSI-RS resource set including NZP-CSI-RS resources #0 to #3 as the specific TRS resource. Note that FIG. 3 illustrates just an example, and the specific TRS resource is not limited to the one illustrated herein.

For example, in FIG. 3, the NZP-CSI-RS resources #0 to #3 in the NZP-CSI-RS resource set used, as the specific TRS resource, are placed in two consecutive slots #n and #n+1. Each of the NZP-CSI-RS resources in the NZP-CSI-RS resource set may be configured based on information related to the configuration of the each of the NZP-CSI-RS resources (hereinafter referred to as "NZP-CSI-RS resource information," for example, "NZP-CSI-RS-Resource" of an RRC Information Element (IE)). Here, the information element can be rephrased as parameter.

Each NZP-CSI-RS resource information may include information related to a symbol and/or a subcarrier in which each NZP-CSI-RS resource is placed (hereinafter referred to as "resource mapping information," e.g., "CSI-RS-Resource Mapping" of RRC IE), information related to the cycle of NZP-CSI-RS resources, (hereinafter referred to as "cycle information," e.g., "periodicityAndOffset" of RRC IE), and the like.

Each resource mapping information may include, for example, at least one of information related to a frequency domain resource for each NZP-CSI-RS resource (hereinafter referred to as "frequency domain allocation information," e.g., "frequencyDomainAllocation" of RRC IE), information related to a time domain resource for each NZP-CSI-RS resource (hereinafter referred to as "time domain allocation information," e.g., "firstOFDMSymbolInTimeDomain" of RRC IE), information related to the density of each NZP-CSI-RS (hereinafter referred to as "density information," e.g., "density" of RRC IE), information related to the number of antenna ports (hereinafter referred to as "port number information," e.g., "nrofPorts" of RRC IE), and so on.

In FIG. 3, subcarriers #2, #6, and #10 within one Resource Block (RB) for the NZP-CSI-RS resource #0 are configured based on frequency domain allocation information on the NZP-CSI-RS resource #0. Herein, since the density of the NZP-CSI-RS resource #0 is 3, the NZP-CSI-RS resource #0 may be constituted by three subcarriers $k_0$, $k_0+4$, $k_0+8$, and the position of the subcarrier $k_0$ may be indicated by a bitmap as the frequency domain allocation information. In FIG. 3, from a bitmap "0010" of four bits corresponding to the subcarriers #0 to #3, the subcarrier $k_0$ for the NZP-CSI-RS resource #0=the subcarrier #2 is derived, and based on the subcarriers $k_0+4$ and $k_0+8$, the subcarriers #6 and #10 for the NZP-CSI-RS resource #0 are derived. Similarly, based on frequency domain allocation information on each of the NZP-CSI-RS resources #1 to #3, subcarriers #2, #6, and #10 for the NZP-CSI-RS resources #1 to #3 are configured.

Further, in FIG. 3, based on time domain allocation information on the NZP-CSI-RS resource #0, a symbol #5 in the slot #n is configured for the NZP-CSI-RS resource #0. For example, in a case where the NZP-CSI-RS resource #0 is constituted by one symbol $l_0$, the position of the symbol $l_0$ may be indicated by the time domain allocation information. In FIG. 3, since the time domain allocation information indicates a symbol index "5," the symbol #5 is the symbol $l_0$. Further, based on time domain resource information on the NZP-CSI-RS resource #1, a symbol #9 in the slot #n is configured for the NZP-CSI-RS resource #1.

Note that the slot #n may be determined based on respective pieces of cycle information on the NZP-CSI-RS resources #0 and #1. Similarly, the slot #n+1 may be determined based on respective pieces of cycle information on the NZP-CSI-RS resources #2 and #3. Further, based on respective pieces of time domain allocation information on the NZP-CSI-RS resources #2 and #3, symbols #5 and #9 within the slot #n+1 are determined for the NZP-CSI-RS resources #2 and #3.

The NZP-CSI-RS resource set including the NZP-CSI-RS resources #0 to #3 may be configured based on information related to the configuration of the NZP-CSI-RS resource set (hereinafter referred to as "NZP-CSI-RS resource set information," e.g., "NZP-CSI-RS-Resource Set" of RRC IE). The NZP-CSI-RS resource set information may include respective pieces of NZP-CSI-RS resource information on the NZP-CSI-RS resources #0 to #3.

Further, the NZP-CSI-RS resource set information may include information indicating that NZP-CSI-RS resources in the NZP-CSI-RS resource set are associated with the same antenna port ("hereinafter referred to as "TRS information," e.g., trs-Info" of RRC IE with a value of "true"). When the terminal 10 receives the NZP-CSI-RS resource set information including TRS information, the terminal 10 may recognize that all NZP-CSI-RS resources in the NZP-CSI-RS set are used as TRS resources. As such, the NZP-CSI-RS resource set information including TRS information may be used as the specific TRS resource information.

The specific TRS resource information is included in, for example, a setup message for RRC connection (hereinafter referred to as "RRC setup message", e.g., RRCSetup message), a resume message (hereinafter referred to as "RRC resume message," e.g., RRCResume message), or a reconfiguration message (hereinafter referred to as "RRC reconfiguration message," e.g., RRCReconfiguration message) and transmitted from the base station 20 to the terminal 10.

TRS in Idle State or Inactive State

Currently, in 3GPP, it is considered that a TRS common to one or more terminals 10 is supported for the terminal 10 in the idle state or the inactive state. More specifically, it is considered that, for the idle state or the inactive state, information (hereinafter referred to as "common TRS resource information") about the configuration of TRS resource information common to one or more terminals 10 (hereinafter referred to as "common TRS resource") is included in system information or an RRC connection release message (e.g., an RRCRelease message) and transmitted from the base station 20 to the terminal 10. The common TRS resource information can be rephrased as second configuration information common to the terminals 10 about the TRS.

Here, the system information includes a Master Information Block (MIB) and one or more System Information Blocks (SIB). The terminal 10 receives the MIB through the PBCH and receives SIB X (X is a given number) through the PDSCH. The common TRS resource information may be included in SIB 1 or may be included in SIB X (for example, any of SIB 2 to SIB 14 defined by Release 16, SIB newly introduced in Release 17 or later, and the like) other than SIB 1. The common TRS resource information may be included in SIB X as cell-specific or terminal-common information.

Thus, the common TRS resource information (the second configuration information) is a cell-specific or terminal-common parameter related to the configuration of the TRS resource. For example, the configuration of a common TRS resource may be associated with each of one or more cells C. That is, the common TRS resource may be configured for each of one or more cells C. Here, the configuration of the common TRS resource may be associated with only one BWP in one cell C. For example, the one cell C may be a primary cell. Further, the one BWP may be Initial Downlink BWP (that is, BWP identified by bwp-id="0"). That is, the common TRS resource may be configured for only one BWP in one cell C. For example, information (bwp-id) used to identify one BWP may not be included in the second configuration information, and one cell and/or one BWP associated with the configuration of the common TRS resource may be defined in advance by specifications or the like.

Figure 4:
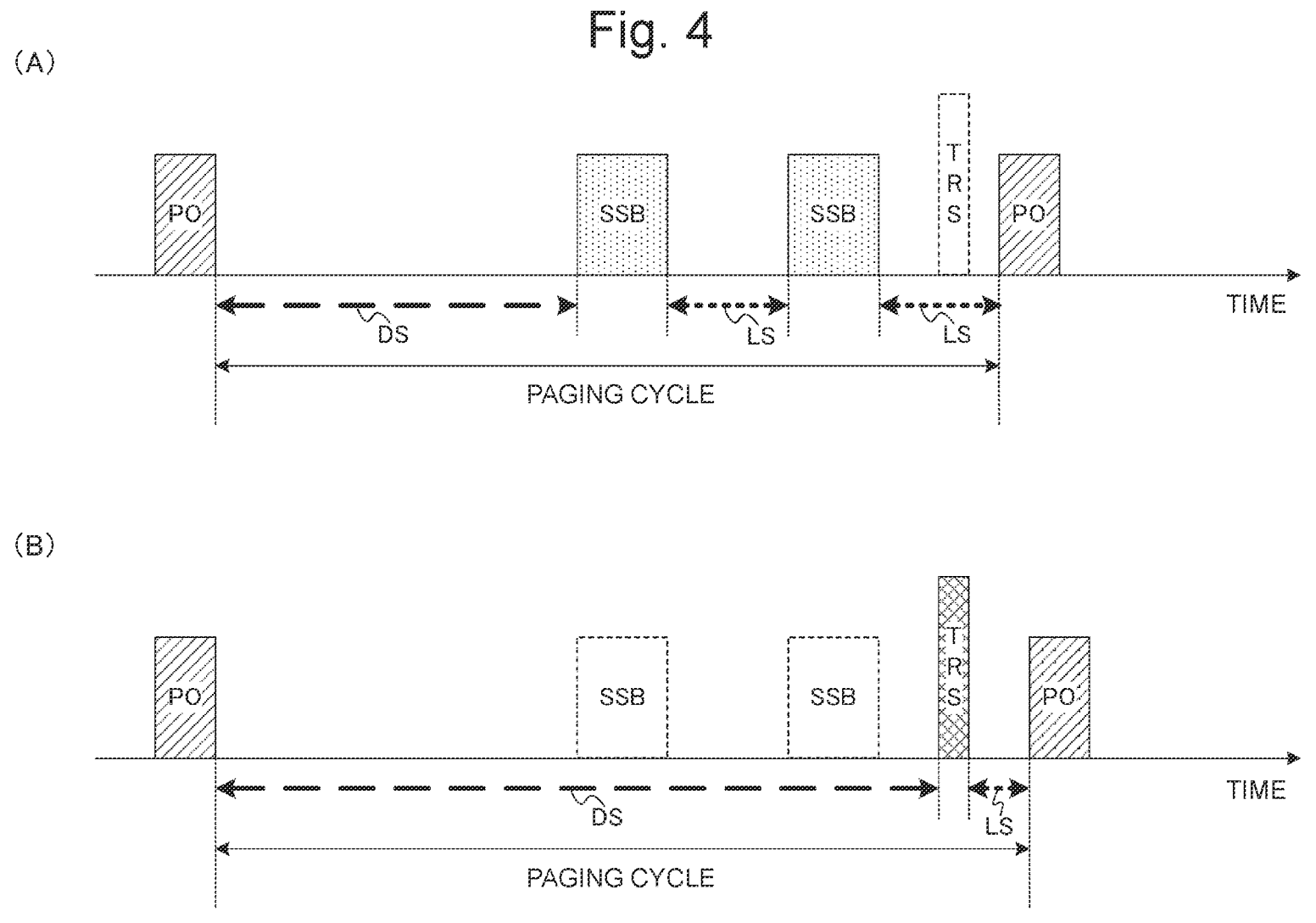

FIG. 4(A) and FIG. 4(B) are diagrams each illustrating an example of the use of a TRS for the terminal 10 in the idle state or the inactive state according to the present embodiment. FIG. 4(A) illustrates an example in which the terminal 10 in the idle state or the inactive state acquires synchronization of time and frequency in the cell C by use of an SSB before Paging Occasion (PO) at a given cycle. The cycle of PO is also called a paging cycle. In the meantime, FIG. 4(B) illustrates an example in which the terminal 10 acquires synchronization of time and frequency in the cell C by use of a TRS before PO.

In FIG. 4(A) and FIG. 4(B), due to DRX, the terminal 10 is activated during PO and sleeps during the other times. The terminal 10 performs monitoring of the PDCCH during PO, and when the terminal 10 detects (also referred to as blind decoding) a DCI (DCI format) to which CRC scrambled by a given identifier (e.g., Paging radio network temporary identifier: P-RNTI) is attached, the terminal 10 receives a paging message through the PDSCH scheduled by use of the DCI.

As illustrated in FIG. 4(A), in a case where the terminal 10 acquires synchronization of time and frequency by use of a SSB before the next PO, such a case is assumed that the terminal 10 is in a Deep Sleep (DS) state from the previous PO until the terminal 10 detects a first SSB, but after the first SSB is detected, the terminal 10 enters a Light Sleep (LS) state in which an effect of reduction in power consumption is lower than that of the Deep Sleep even if the terminal 10 sleeps.

In the meantime, as illustrated in FIG. 4(B), in a case where the terminal 10 acquires synchronization of time and frequency by use of the TRS before the next PO, it is expected that the terminal 10 can maintain the DS state for a longer time than in FIG. 4(A). That is, the synchronization of time and frequency by use of the TRS can contribute to reduction in power consumption of the terminal 10 in comparison with the synchronization by use of the SSB. Here, the synchronization of time and frequency may use the TRS and the SSB. For example, in FIG. 4(B), the terminal 10 may acquire synchronization of time and frequency by use of a TRS before the next PO and an SSB nearest to the next PO. That is, the TRS may be used to supplement the synchronization of time and frequency by use of the SSB. Even in this case, the terminal 10 does not need to detect the first SSB and is expected to be maintainable in the DS state for a long time in comparison with FIG. 4(A), and therefore, the synchronization of time and frequency by use of the TRS and the SSB can contribute to reduction in power consumption of the terminal 10 in comparison with the synchronization using only the SSB.

Note that the use of the TRS for the terminal 10 in the idle state or the inactive state as illustrated in FIG. 4(A) and FIG. 4(B) is just an example and the TRS may be used for other uses except synchronization of time and frequency before PO. For example, the TRS for the terminal 10 in the idle state or the inactive state is usable for Auto gain control (AGC) or Radio Resource Management measurement (RRM measurement).

In a case where the TRS for the terminal 10 in the idle state or the inactive state is newly supported as such, the terminal 10 might not be able to control communication appropriately. For example, the terminal 10 that has transitioned from the idle state or the inactive state to the connected state might not be able to control an operation using a TRS for the connected state (e.g., at least one of the tracking, the estimation of path delay spread, the estimation of Doppler spread, and the like) appropriately.

Figure 5:
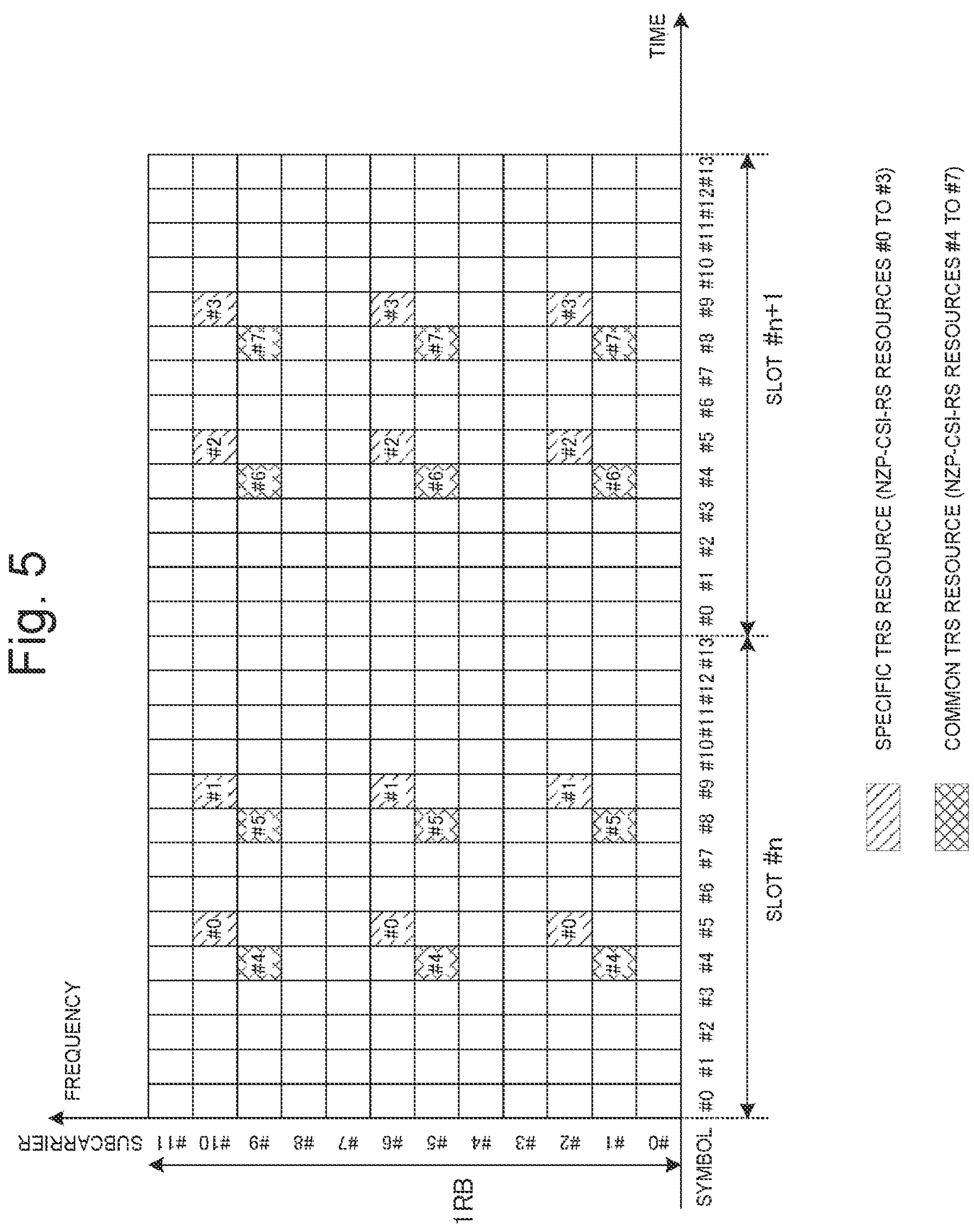
FIG. 5 is a diagram illustrating an example of the configuration of specific TRS resources and common TRS resources according to the present embodiment.

FIG. 5 is a diagram illustrating an example of the configuration of the specific TRS resource and the common TRS resource according to the present embodiment. In FIG. 5, an NZP-CSI-RS resource set including NZP-CSI-RS resources #0 to #4 is configured as the terminal-specific TRS resource, as described in FIG. 3. Further, in FIG. 5, an NZP-CSI-RS resource set including NZP-CSI-RS resources #5 to #7 is configured as the terminal-common TRS resource.

For example, in FIG. 5, a specific TRS resource can be configured as described in FIG. 3 based on NZP-CSI-RS resource set information included, as the specific TRS resource information, in an RRC setup message, an RRC resume message, or an RRC reconfiguration message. Further, a common TRS resource can be configured as described in FIG. 3 based on NZP-CSI-RS resource set information included, as the common TRS resource information, in system information or an RRC release message (e.g., RRCRelease message). Note that, in FIG. 5, the density of the specific TRS resource and the number of NZP-CSI-RS resources are the same as those of the common TRS resource but are not limited to them. The specific TRS resource may be configured by use of an arrangement pattern different from the common TRS resource (e.g., an arrangement pattern different in at least one of the density, the cycle, the number of NZP-CSI-RS resources, and positions of a time domain and a frequency domain).

For example, as illustrated in FIG. 5, in a case where specific TRS resources and common TRS resources are arranged at different Resource Elements (REs), the terminal 10 transitioning from the idle state or the inactive state to the connected state confuses the specific TRS resources with the common TRS resources, so that the terminal 10 might not be able to operate appropriately. In FIG. 5, the base station 20 transmits a PDSCH, assuming that the terminal 10 in the connected state performs at least one of the tracking, the estimation of path delay spread, the estimation of Doppler spread, and the like by use of the specific TRS resources (NZP-CSI-RS resources #0 to #3). In this case, if the terminal 10 performs at least one of the tracking, the estimation of path delay spread, the estimation of Doppler spread, and the like by use of the common TRS resources (NZP-CSI-RS resources #4 to #7), the terminal 10 might not be able to receive the PDSCH appropriately.

In view of this, in the present embodiment, in a case where the terminal 10 transitions from the idle state or the inactive state to the connected state, the terminal 10 releases the common TRS resources (a first TRS resource control). Alternatively, the terminal 10 configures common TRS resources independently from the specific TRS resources (a second TRS resource control). For example, in the second TRS resource control, the common TRS resources (the configuration of the common TRS resources) may be defined as a configuration used when the terminal 10 is in the idle state or the inactive state. Further, in the second TRS resource control, the specific TRS resources (the configuration of the specific TRS resources) may be defined as a configuration used when the terminal 10 is in the connected state. Hereby, in a case where the common TRS resources are supported in addition to the specific TRS resources, it is possible to prevent the terminal 10 from confusing the specific TRS resources with the common TRS resources.

First TRS Resource Control

In the first TRS resource control, in a case where the terminal 10 transitions from the idle state or the inactive state to the connected state, the common TRS resource information (the second configuration information) is released. Here, the common TRS resource information may be based on at least part of the specific TRS resource information (the first configuration information). For example, as described above, as the common TRS resource information and the specific TRS resource information, the NZP-CSI-RS resource set information may be used.

Case of Transitioning from Idle State to Connected State

FIG. 6 is a diagram illustrating an example of the first TRS resource control according to the present embodiment. For example, FIG. 6 illustrates a case where the terminal 10 in the idle state transitions to the connected state.

As illustrated in FIG. 6, in step S101, the terminal 10 in the idle state receives system information from the base station 20. The system information may include common TRS resource information common to terminals 10 in the cell C on which the terminal 10 camps. Note that the common TRS resource information may be included in an RRC release message received from the base station 20 when the terminal 10 transitions from the connected state or the inactive state to the idle state.

In step S102, the terminal 10 in the idle state operates based on the common TRS resource information. For example, the terminal 10 in the idle state may perform synchronization of time and frequency before PO as illustrated in FIG. 4(B) by use of terminal-common TRS resources (e.g., the NZP-CSI-RS resources #4 to #7 in FIG. 5) configured based on the common TRS resource information.

In step S103, the terminal 10 in the idle state starts Random Access Procedure. More specifically, the terminal 10 transmits Random Access Preamble to the base station 20. In step S104, the base station 20 transmits Random Access Response (RAR) to the terminal 10 in response to the Random Access Preamble from the terminal 10.

In step S105, the terminal 10 starts a procedure to establish RRC connection in response to the RAR. More specifically, the terminal 10 transmits an RRC setup request message (e.g., RRCSetupRequest message) to the base station 20.

In step S106, the base station 20 transmits an RRC setup message to the terminal 10 in response to the RRC setup request message from the terminal 10. The terminal 10 transitions from the idle state to the connected state upon receipt of the RRC setup message. The RRC setup message may include specific TRS resource information.

In step S107, the terminal 10 in the connected state releases the common TRS resource information. That is, the terminal 10 transitioning from the idle state to the connected state upon receipt of the RRC setup message including the specific TRS resource information (the configuration of specific TRS resources) may release the common TRS resource information (the configuration of the common TRS resources). More specifically, the common TRS resources (e.g., the NZP-CSI-RS resources #4 to #7 in FIG. 5) configured based on the common TRS resource information may be released. Note that "release" may be rephrased as "remove," "delete," or the like. That is, in a case where the terminal 10 in the connected state receives the common TRS resource information and also receives the specific TRS resource information, the terminal 10 may release the common TRS resource information. Further, in a case where the terminal 10 in the connected state receives the common TRS resource information and also receives the specific TRS resource information, the terminal 10 may use a specific TRS resource configured based on the specific TRS resource information. Further, the terminal 10 in the connected state may assume that a TRS is transmitted in the specific TRS resource. For example, in a case where the terminal 10 in the connected state receives, from the base station 20, information indicating that a TRS is available, the terminal 10 may receive the TRS in the specific TRS resource.

In step S108, the terminal 10 in the connected state operates based on the specific TRS resource information received in step S106. For example, the terminal 10 performs at least one of the tracking, the estimation of path delay spread, the estimation of Doppler spread, and the like by use of specific TRS resources (e.g., the NZP-CSI-RS resources #0 to #3 in FIG. 5) configured based on the specific TRS resource information.

Note that, in a case where the terminal 10 in the connected state receives an RRC reconfiguration message for reconfiguring the RRC connection established between the terminal 10 in the connected state and the base station 20, the terminal 10 may perform the operation in step S108 based on specific TRS resource information included in the RRC reconfiguration message.

In step S109, the terminal 10 in the connected state receives system information including common TRS resource information from the base station 20. In step S110, the terminal 10 in the connected state discards the common TRS resource information. Note that "discard" may be rephrased as "ignore" or the like. That is, in a case where the terminal 10 receives the RRC setup message, the terminal 10 transitions to the connected state, and if the system information includes common TRS resource information (the configuration of common TRS resources), the terminal 10 may discard the common TRS resource information (the configuration of the common TRS resources) included in the system information (that is, acquired from the system information).

For example, in a case where the terminal 10 is in the connected state and a given timer (also called T311) is not running, when the terminal 10 receives common TRS resource information (the configuration of common TRS resources), the terminal 10 may discard the common TRS resource information (the configuration of the common TRS resources). Here, the terminal 10 may start the given timer based on the start of an RRC connection re-establishment procedure. Further, the terminal 10 may stop the given timer based on selection of an appropriate cell (also called an NR cell) or selection of a cell using other Radio Access Technologies.

As described above, in a case where the terminal 10 transitions from the idle state to the connected state, common TRS resources (e.g., the NZP-CSI-RS resources #4 to #7 in FIG. 5) for the terminal 10 in the idle state are released. Accordingly, this makes it possible to prevent the terminal 10 transitioning from the idle state to the connected state from confusing the specific TRS resources with the common TRS resources in a case where the common TRS resources are supported in addition to the specific TRS resources.

Case of Transitioning from Inactive State to Connected State

Figure 7:
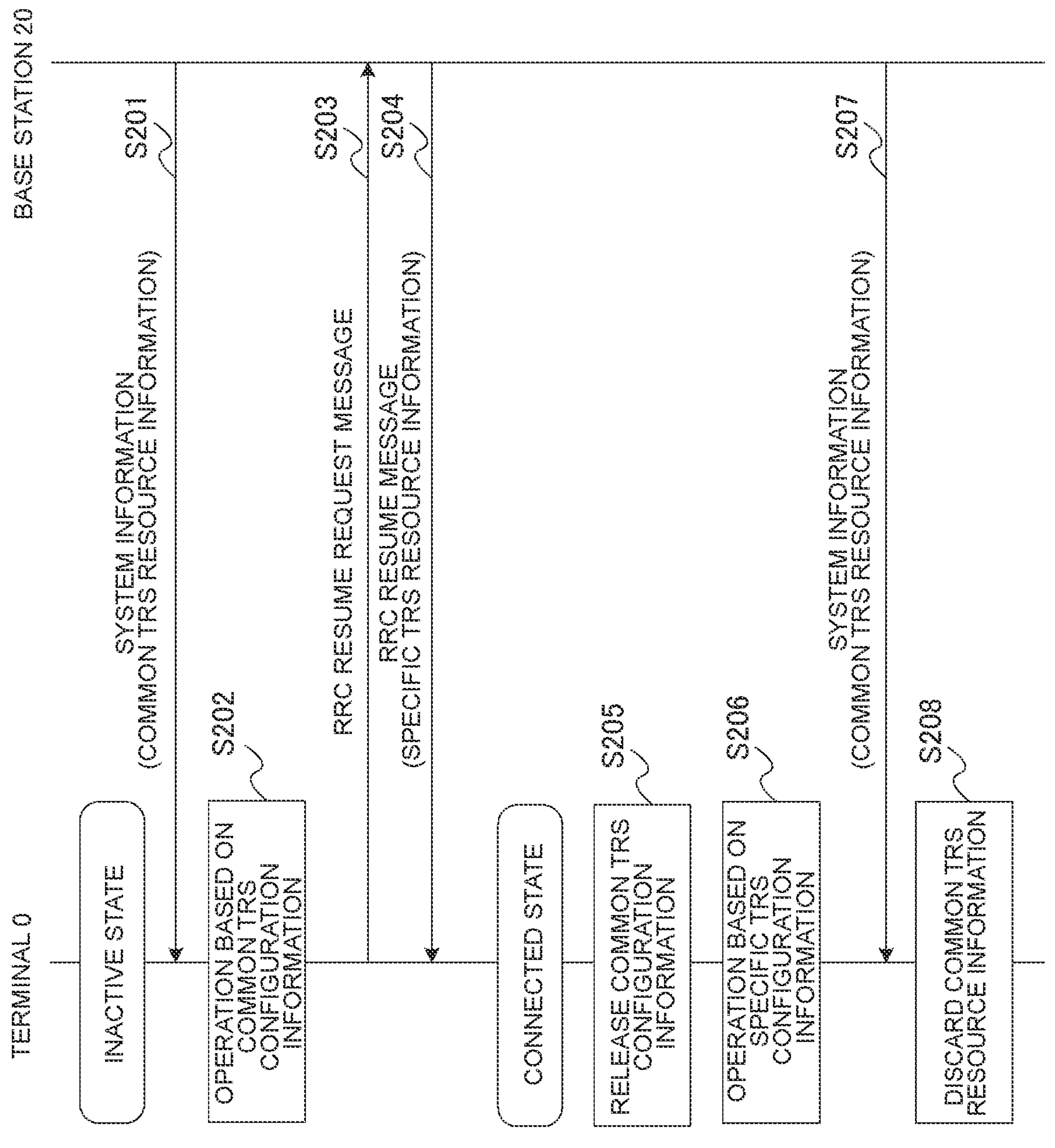
FIG. 7 is a diagram illustrating another example of the first TRS resource control according to the present embodiment.

FIG. 7 is a diagram illustrating another example of the first TRS resource control according to the present embodiment. For example, FIG. 7 illustrates a case where the terminal 10 in the inactive state transitions to the connected state. Note that, in terms of FIG. 7, the following mainly describes points different from FIG. 6.

As illustrated in FIG. 7, in step S201, the terminal 10 in the inactive state receives system information from the base station 20. The system information may include common TRS resource information common to terminals 10 in the cell C on which the terminal 10 camps. Note that the common TRS resource information may be included in an RRC release message received from the base station 20 when the terminal 10 transitions from the connected state to the inactive state.

In step S202, the terminal 10 in the inactive state operates based on the common TRS resource information. For example, the terminal 10 in the inactive state may perform synchronization of time and frequency before PO as illustrated in FIG. 4(B) by use of common TRS resources (e.g., the NZP-CSI-RS resources #4 to #7 in FIG. 5) configured based on the common TRS resource information.

In step S203, the terminal 10 in the inactive state starts a procedure to resume RRC connection. More specifically, the terminal 10 transmits an RRC resume request message (e.g., RRCResumeRequest message) to the base station 20.

In step S204, the base station 20 transmits the RRC resume request message to the terminal 10 in response to the RRC setup request message. The terminal 10 transitions from the inactive state to the connected state upon receipt of the RRC resume message. The RRC resume message may include specific TRS resource information.

In step S205, the terminal 10 in the connected state releases the common TRS resource information. That is, the terminal 10 transitioning from the inactive state to the connected state upon receipt of the RRC resume message including the specific TRS resource information (the configuration of specific TRS resources) may release the common TRS resource information (the configuration of the common TRS resources). More specifically, the common TRS resources (e.g., the NZP-CSI-RS resources #4 to #7 in FIG. 5) configured based on the common TRS resource information may be released.

In step S206, the terminal 10 in the connected state operates based on the specific TRS resource information received in step S204. Note that details of steps S206 to S208 are similar to steps S108 to S110 in FIG. 6. That is, in a case where the terminal 10 in the connected state receives common TRS resource information (the configuration of common TRS resources), the terminal 10 may discard the common TRS resource information (the configuration of the common TRS resources). Further, in a case where the terminal 10 receives an RRC setup message including specific TRS resource information, the terminal 10 transitions to the connected state, and if the system information includes common TRS resource information (the configuration of common TRS resources), the terminal 10 may discard the common TRS resource information (the configuration of the common TRS resources) included in the system information (that is, acquired from the system information).

Note that, in step S204, the base station 20 may transmit an RRC setup message including specific TRS resource information to the terminal 10 instead of the RRC resume message, in response to the RRC resume request message.

As described above, in a case where the terminal 10 transitions from the inactive state to the connected state, the common TRS resources (e.g., the NZP-CSI-RS resources #4 to #7 in FIG. 5) for the terminal 10 in the inactive state are released. Accordingly, this makes it possible to prevent the terminal 10 transitioning from the inactive state to the connected state from confusing the specific TRS resources with the common TRS resources in a case where the common TRS resources are supported in addition to the specific TRS resources.

Case of Transitioning from Connected State to Idle State or Inactive State

FIG. 8 is a diagram illustrating further another example of the first TRS resource control according to the present embodiment. For example, FIG. 8 illustrates a case where the terminal 10 in the connected state transitions to the idle state or the inactive state. Note that, in terms of FIG. 8, the following mainly describes points different from FIG. 6 or FIG. 7.

As illustrated in FIG. 8, in step S301, the terminal 10 in the connected state operates based on specific TRS resource information. Note that details of step S301 are similar to step S108 in FIG. 6 or step S206 in FIG. 7.

In step S302, the terminal 10 in the connected state receives an RRC release message from the base station 20. In a case where the terminal 10 receives an RRC release message including a specific parameter (e.g., RRC IE "suspendConfig"), the terminal 10 transitions from the connected state to the inactive state. In the meantime, in a case where the terminal 10 receives an RRC release message including no specific parameter, the terminal 10 transitions from the connected state to the idle state.

In step S303, the terminal 10 in the inactive state or the idle state may operate based on at least part of the specific TRS resource information used in step S301. For example, the terminal 10 in the inactive state or the idle state may use at least part of the NZP-CSI-RS resources (e.g., at least one of the NZP-CSI-RS resources #0 to #3 in FIG. 5) indicated by NZP-CSI-RS resource set information as the specific TRS resource information. Further, for example, the terminal 10 in the inactive state or the idle state may use TRS information as the specific TRS resource information. Hereby, at least part of the specific TRS resources is also available as a common TRS resource.

Note that, in step S303, the terminal 10 in the inactive state or the idle state may release the specific TRS resource information and operate based on the common TRS resource information included in the RRC release message in step S302 or common TRS resource information included in system information (not illustrated). That is, the terminal 10 in the inactive state or the idle state may assume that a TRS is transmitted in a TRS resource determined based on at least part of the specific TRS resource information. For example, in a case where the terminal 10 in the inactive state or the idle state receives, from the base station 20, information indicating that a TRS is available, the terminal 10 may receive a TRS in a TRS resource determined based on at least part of the specific TRS resource information. Further, in a case where the terminal 10 transitions from the connected state to the inactive state or the idle state, the terminal 10 may release the specific TRS resource information (the configuration of specific TRS resources).

As described above, in a case where the terminal 10 transitions from the connected state to the inactive state or the idle state, the terminal 10 operates based on at least part of the specific TRS resource information, so that a TRS resource available as both a terminal-specific TRS resource and a terminal-common TRS resource can be configured.

In the first TRS resource control, when the terminal 10 transitions from the idle state or the inactive state to the connected state, the terminal-common TRS resource is released, thereby making it possible to prevent confusion between the common TRS resource and the specific TRS resource. Further, by configuring the common TRS resource information based on at least part of the specific TRS resource information, it is possible to prevent an increase in design load along with support of common TRS resources.

Second TRS Resource Control

In the second TRS resource control, common TRS resources are configured independently from specific TRS resources. Further, common TRS resource information (the configuration of common TRS resources) may be defined as a configuration used when the terminal 10 is in the idle state or the inactive state. That is, the common TRS resource information (the configuration of the common TRS resources) may be defined as a configuration to be used only when the terminal 10 is in the idle state or the inactive state and not to be used when the terminal 10 is in the connected state. Further, specific TRS resource information (the configuration of specific TRS resources) may be defined as a configuration used when the terminal 10 is in the connected state. That is, the specific TRS resource information (the configuration of the specific TRS resources) may be defined as a configuration to be used only when the terminal 10 is in the connected state and not to be used when the terminal 10 is in the idle state or the inactive state. As such, the specific TRS resource information and the common TRS resource information may be configuration information defined for respective specific states (e.g., the idle state, the inactive state, and the connected state) of the terminal 10.

For example, in a case where the terminal 10 is in the idle state or the inactive state, the terminal 10 uses common TRS resources determined based on the common TRS resource information. Further, in a case where the terminal 10 is in the connected state, the terminal 10 uses specific TRS resources determined based on the specific TRS resource information. For example, in a case where the terminal 10 transitions from the connected state to the idle state or the inactive state, the terminal 10 may not release the common TRS resource information (the configuration of the common TRS resources) (also referred to holding or suspending of the common TRS resource information (the configuration of the common TRS resources).

Here, an independent format may include a case where part of or all of information elements (also referred to as a parameter set) used to configure specific TRS resources are different from part of or all of information elements (also referred to as a parameter set) used to configure common TRS resources. For example, as described above, the specific TRS resource information may include information (bwp-id) used to identify one BWP (downlink BWP), and the common TRS resource information may not include information (bwp-id) used to identify one BWP (downlink BWP). Further, the specific TRS resource information may include information used to instruct the type of TRS resource (e.g., information used to instruct to configure a TRS resource to be "aperiodic," "semi-persistent," or "periodic"), and the common TRS resource information may not include the information used to instruct the type of TRS resource. For example, in a case where the terminal 10 is in the idle state or the inactive state, the terminal 10 may be assumed to always use "periodic" as the type of TRS resource.

Further, for example, in the independent format, the specific TRS resource information may include a cycle and an offset of a TRS, and the common TRS resource information may also include a cycle and an offset of a TRS. Here, the value of the cycle and the value of the offset of the TRS included in the specific TRS resource information may be different from the value of the cycle and the value of the offset of the TRS included in the common TRS resource information. Thus, the independent format may include independently defining the information elements (also referred to as a parameter set) used to configure specific TRS resources for the connected state and the information elements used to configure the common TRS resources for the idle state or the inactive state.

In the second TRS resource control, common TRS resources are configured by use of the common TRS resource information in a format independent from the specific TRS resource information. Further, the common TRS resource information (the configuration of the common TRS resources) may be defined as a configuration used when the terminal 10 is in the idle state or the inactive state. Further, the specific TRS resource information (the configuration of specific TRS resources) may be defined as a configuration used when the terminal 10 is in the connected state. Accordingly, the common TRS resources can be configured flexibly in accordance with the use of a TRS for the idle state or a inactive state. Further, in a case where the terminal 10 transitions from the idle state or the inactive state to the connected state, no confusion with the specific TRS resource information occurs even without releasing the common TRS resource information, so that the terminal 10 can operate appropriately based on the specific TRS resource information.

Configuration of Wireless Communication System

Next will be described the configuration of each equipment in the wireless communication system 1. Note that the following configurations are intended to describe a necessary configuration in the description of the present embodiment and do not exclude each equipment from including a functional block other than those illustrated herein.

Hardware Configuration

Figure 9:
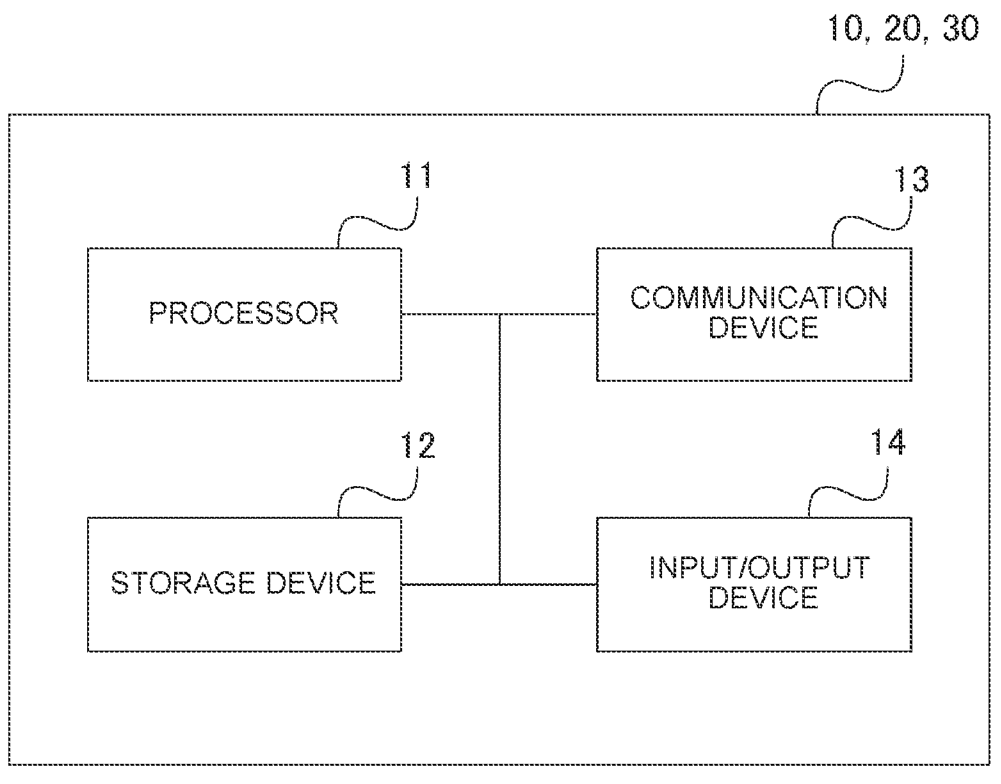
FIG. 9 is a diagram illustrating an example of the hardware configuration of each equipment in the wireless communication system according to the present embodiment.

FIG. 9 is a diagram illustrating an example of the hardware configuration of each equipment in the wireless communication system according to the present embodiment. Each equipment in the wireless communication system 1 (for example, the terminal 10, the base station 20, the CN 30, or the like) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 and execute the program to perform various processing to be described in the present embodiment. Each equipment in the wireless communication system 1 may also be configured to include one or more processors 11. Further, each equipment concerned may also be called a computer.

The storage device 12 is constituted by, for example, storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks and may include a network card, a communication module, a chip, an antenna, and the like, for example. Further, an amplifier, an RF (Radio Frequency) device for performing processing on radio signals, and a BB (Base Band) device for performing processing on baseband signals may be included in the communication device 13.

The RF device performs D/A conversion, modulation, frequency conversion, power amplification, and the like on a digital baseband signal received from the BB device, for example, to generate a radio signal to be transmitted from an antenna A. Further, the RF device performs frequency conversion, demodulation, A/D conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse, and/or a microphone, and output devices such as a display and/or a speaker, for example.

Note that the hardware configuration described above is just an example. In each equipment inside the wireless communication system 1, part of the hardware illustrated in FIG. 25 may be omitted, or any other hardware unillustrated in FIG. 25 may be included. Further, the hardware illustrated in FIG. 4 may be constituted by one or more chips.

Functional Block Configuration

Terminal

Figure 10:
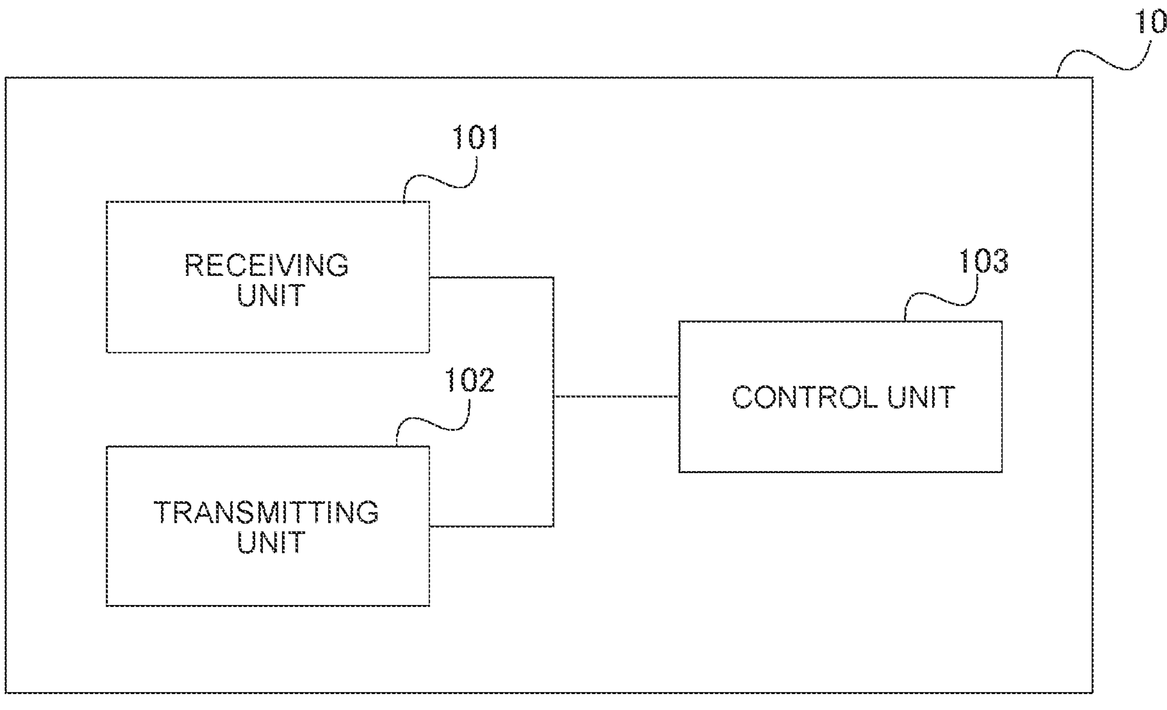
FIG. 10 is a diagram illustrating an example of the functional block configuration of the terminal according to the present embodiment.

FIG. 10 is a diagram illustrating an example of the functional block configuration of the terminal according to the present embodiment. As illustrated in FIG. 10, the terminal 10 includes a receiving unit 101, a transmitting unit 102, and a control unit 103.

All or some of the functions implemented by the receiving unit 101 and the transmitting unit 102 can be achieved by use of the communication device 13. Further, all or some of the functions implemented by the receiving unit 101 and the transmitting unit 102, and the control unit 103 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 101 receives downlink signals. Further, the receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal.

The downlink signal may include, for example, at least one of the PDCCH, the PDSCH, a downlink reference signal, the synchronization signal, the broadcast channel, and so on. The downlink reference signal may include a Demodulation Reference Signal (DMRS) such as the TRS, the CSI-RS, the NZP-CSI-RS, the PDCCH, or the PDSCH.

More specifically, the receiving unit 101 receives specific TRS resource information (the first configuration information specific to a terminal) and common TRS resource information (the second configuration information common to terminals). In the second TRS resource control, the specific TRS resource information is configuration information used in the connected state but not used in the idle state or the inactive state, and the common TRS resource information is configuration information used in the idle state or the inactive state but not used in the connected state. As such, in the second TRS resource control, the specific TRS resource information and the common TRS resource information are defined for respective specific states (e.g., the idle state, the inactive state, and the connected state) of the terminal 10. In the meantime, in the first TRS resource control, the specific TRS resource information and the common TRS resource information may be defined not to be limited to respective specific states of the terminal 10.

Further, the common TRS resource information may be included in system information or an RRC release message. Further, the specific TRS resource information may be included in an RRC setup message or an RRC reconfiguration message.

The transmitting unit 102 transmits uplink signals. Further, the transmitting unit 102 may also transmit information and/or data to be transmitted through each uplink signal. Here, for example, the verb "transmit" may also include the meaning of performing processing related to transmission including at least one of encoding, modulation, mapping, and transmission of a radio signal. The uplink signals may include, for example, at least one of the PUSCH, a random access preamble (a Physical Random Access Channel (PRACH)), an uplink reference signal, and so on.

The control unit 103 performs various controls in the terminal 10. More specifically, the control unit 103 controls transition between the connected state using a TRS configured based on specific TRS resource information and the idle state or the inactive state using a TRS configured based on common TRS resource information. Note that "TRS" can be rephrased as "TRS resource."

In a case where the terminal 10 transitions from the idle state or the inactive state to the connected state, the control unit 103 may release the common TRS resource information (the first TRS resource control).

In a case where the receiving unit receives the common TRS resource information during the connected state, the control unit 103 may discard the common TRS resource information (the first TRS resource control).

In a case where the terminal 10 transitions from the connected state to the idle state or the inactive state, the control unit 103 may control reception of a TRS based on at least part of the specific TRS resource information or may release the specific TRS resource information (the first TRS resource control).

Base Station

Figure 11:
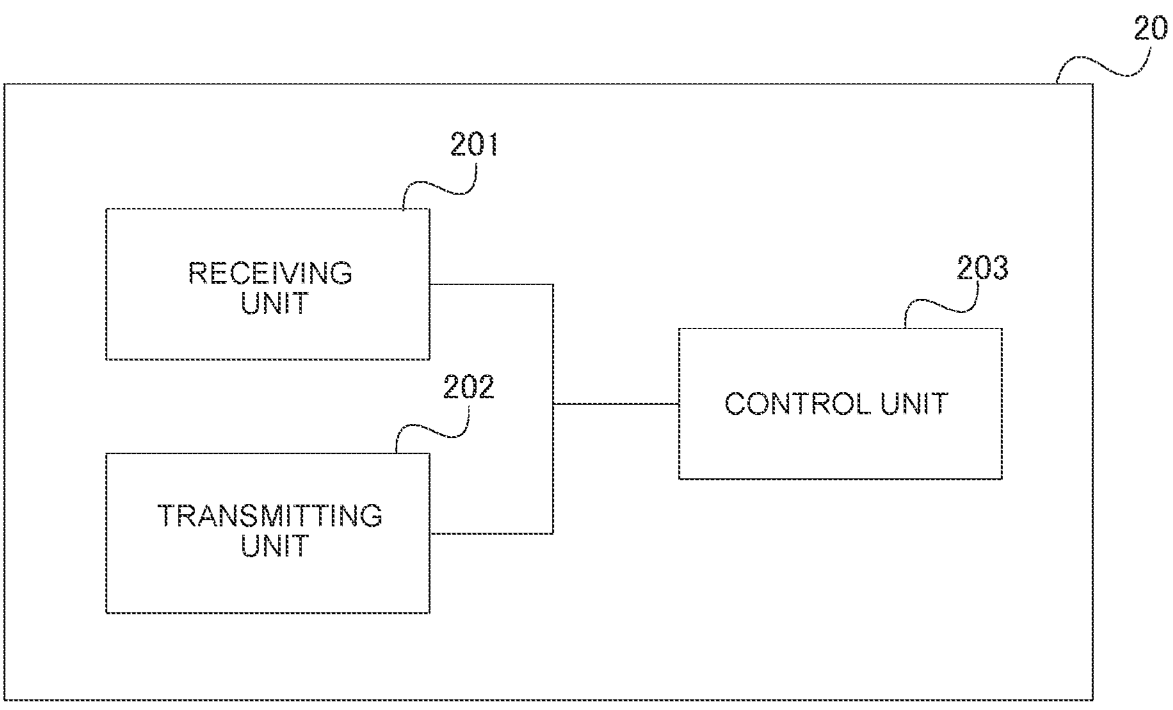
FIG. 11 is a diagram illustrating an example of the functional block configuration of a base station according to the present embodiment.

FIG. 11 is a diagram illustrating an example of the functional block configuration of the base station according to the present embodiment. As illustrated in FIG. 11, the base station 20 includes a receiving unit 201, a transmitting unit 202, and a control unit 203.

All or some of the functions implemented by the receiving unit 201 and the transmitting unit 202 can be achieved by use of the communication device 13. Further, all or some of the functions implemented by the receiving unit 201 and the transmitting unit 202, and the control unit 203 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 201 receives the above-mentioned uplink signals. Further, the receiving unit 201 may also receive information and/or data transmitted through each of the above-mentioned uplink signals.

The transmitting unit 202 transmits the above-mentioned downlink signals. Further, the transmitting unit 202 may also transmit information and/or data to be transmitted through each of the above-mentioned downlink signals. More specifically, the transmitting unit 202 transmit the specific TRS resource information and the common TRS resource information.

The control unit 203 performs various controls in the base station 20. The control unit 203 controls transmission of the specific TRS resource information and the common TRS resource information.

OTHER EMBODIMENTS

Various signals, information, and parameters in the aforementioned embodiment may be signaled in any layer. In other words, the various signals, information, and parameters mentioned above may be also replaced with signals, information, and parameters in any layer such as the upper layer (for example, a Non Access Stratum (NAS) layer, an RRC layer, a MAC layer, or the like) or the lower layer (for example, a physical layer). Further, given information is not limited to be explicitly informed and may also be implicitly informed (for example, by not informing the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers.

Further, the applications of the terminal 10 in the aforementioned embodiment (for example, for Red Cap, IoT, and the like) are not limited to those described herein, and the terminal 10 may also be used for any other purpose (for example, for eMBB, URLLC, Device-to-Device (D2D), Vehicle-to-Everything (V2X), or the like) as long as it has similar functions. Further, the format of various information is not limited to that in the aforementioned embodiment, and it may be changed accordingly such as to bit representation (0 or 1), Boolean (true or false), integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indexes, conditions, and the like included in the embodiment are not limited to those described and can be changed accordingly. Further, at least some of components described in the aforementioned embodiment can be partially replaced or combined.

In the above embodiment, the first TRS resource control and the second TRS resource control may be performed in combination. More specifically, in the second TRS resource control, in a case where the terminal 10 transitions from the connected state to the idle state or the inactive state, the terminal 10 may discard or release the common TRS resource information (the configuration of common TRS resources). Further, in a case where the terminal 10 transitions from the connected state to the idle state or the inactive state, the base station 20 may regard the common TRS resource information (the configuration of common TRS resources) received by the terminal 10 to be discarded or released.

As described above, the terminal according to the present embodiment may include a receiving unit which receives first configuration information specific to a terminal about a reference signal for tracking and second configuration information common to terminals about the reference signal, and a control unit which controls transition between a connected state using the reference signal configured based on the first configuration information and an idle state or an inactive state using the reference signal configured based on the second configuration information. In a case where the terminal transitions from the idle state or the inactive state to the connected state, the control unit may release the second configuration information.

Further, in the terminal, in a case where the receiving unit receives the second configuration information during the connected state, the control unit may discard the second configuration information.

Further, in the terminal, in a case where the terminal transitions from the connected state to the idle state or the inactive state, the control unit may control reception of the reference signal based on at least part of the first configuration information or release the first configuration information.

Further, the terminal according to the present embodiment may include a receiving unit which receives first configuration information specific to a terminal about a reference signal for tracking and second configuration information common to terminals about the reference signal, and a control unit which controls transition between a connected state using the reference signal configured based on the first configuration information and an idle state or an inactive state using the reference signal configured based on the second configuration information. The first configuration information may be configuration information used in the connected state but not used in the idle state or the inactive state, and the second configuration information may be configuration information used in the idle state or the inactive state but not used in the connected state.

In the terminal, the second configuration information may be included in system information or a release message for radio resource control (RRC) connection.

In the terminal, the first configuration information may be included in a setup message, a resume message, or a reconfiguration message for radio resource control (RRC) connection.

Further, the wireless communication method according to the present embodiment may include a step of receiving first configuration information specific to a terminal about a reference signal for tracking and second configuration information common to terminals about the reference signal, and a step of controlling transition between a connected state using the reference signal configured based on the first configuration information and an idle state or an inactive state using the reference signal configured based on the second configuration information, and in the step of controlling the transition, in a case where the idle state or the inactive state is transitioned to the connected state, the second configuration information may be released.

Further, the wireless communication method according to the present embodiment may include a step of receiving first configuration information specific to a terminal about a reference signal for tracking and second configuration information common to terminals about the reference signal, and a step of controlling transition between a connected state using the reference signal configured based on the first configuration information and an idle state or an inactive state using the reference signal configured based on the second configuration information. The first configuration information may be configuration information used in the connected state but not used in the idle state or the inactive state, and the second configuration information may be configuration information used in the idle state or the inactive state but not used in the connected state.

The invention claimed is:

1. A terminal comprising:

a receiving unit configured to:

receive system information including first configuration information for configuring a first resource for a reference signal for tracking that is used in a case where the terminal is in a radio resource control (RRC) idle state or an RRC inactive state, receive an RRC message including second configuration information for configuring a second resource for a reference signal for tracking that is used in a case where the terminal is in an RRC connected state, and receive, on a physical downlink control channel (PDCCH), downlink control information (DCI) used for scheduling of a physical downlink shared channel (PDSCH); and a control unit configured to:

use, in the RRC idle state or the RRC inactive state, the first resource for the reference signal for tracking, the first resource being configured based on the first configuration information, and control, in the RRC connected state, reception of the PDSCH based on the reference signal for tracking in the second resource configured based on the second configuration information such that the first resource configured based on the first configuration information is ignored, the PDSCH being scheduled by using the DCI.

2. The terminal according to claim 1, wherein, in the RRC idle state or the RRC inactive state, the receiving unit is configured to:

receive a configuration for configuring a period for indicating an availability of the reference signal for tracking, and receive on the PDCCH, the DCI including information for indicating the availability of the reference signal for tracking in the first resource during the period.

3. The terminal according to claim 2, wherein Cyclic Redundancy Check (CRC) scrambled by a Paging-radio network temporary identifier (P-RNTI) is attached to the DCI including the information for indicating the availability of the reference signal for tracking.

4. The terminal according to claim 3, wherein a paging early indication is included in the DCI including the information for indicating the availability of the reference signal for tracking.

5. The terminal according to claim 2, wherein a paging early indication is included in the DCI including the information for indicating the availability of the reference signal for tracking.

6. A base station comprising:

a transmitting unit configured to:

transmit system information including first configuration information for configuring a first resource for a reference signal for tracking that is used in a case where a terminal is in a radio resource control (RRC) idle state or an RRC inactive state, transmit an RRC message including second configuration information for configuring a second resource for a reference signal for tracking that is used in a case where the terminal is in an RRC connected state, and transmit on a physical downlink control channel (PDCCH), downlink control information (DCI) used for scheduling of a physical downlink shared channel (PDSCH); and a control unit configured to:

control transmission of the reference signal for tracking in the first resource to the terminal in the RRC idle state or the RRC inactive state, the first resource being configured based on the first configuration information, and control transmission of the PDSCH to the terminal in the RRC connected state, based on the reference signal for tracking in the second resource configured based on the second configuration information such that the first resource configured based on the first configuration information is ignored, the PDSCH being scheduled by using the DCI.

7. The base station according to claim 6, wherein the transmitting unit is configured to:

transmit a configuration for configuring a period for indicating an availability of the reference signal for tracking, and transmit, to the terminal in the RRC idle state or the RRC inactive state, on the PDCCH, the DCI including information for indicating the availability of the reference signal for tracking in the first resource during the period.

8. The base station according to claim 7, wherein Cyclic Redundancy Check (CRC) scrambled by a Paging-radio network temporary identifier (P-RNTI) is attached to the DCI including the information for indicating the availability of the reference signal for tracking.

9. The base station according to claim 8, wherein a paging early indication is included in the DCI including the information for indicating the availability of the reference signal for tracking.

10. The base station according to claim 7, wherein a paging early indication is included in the DCI including the information for indicating the availability of the reference signal for tracking.

11. A wireless communication method for a terminal, the wireless communication method comprising:

a step of receiving system information including first configuration information for configuring a first resource for a reference signal for tracking that is used in a case where the terminal is in a radio resource control (RRC) idle state or an RRC inactive state;

a step of receiving an RRC message including second configuration information for configuring a second resource for a reference signal for tracking that is used in a case where the terminal is in an RRC connected state;

a step of receiving on a physical downlink control channel (PDCCH), downlink control information (DCI) used for scheduling of a physical downlink shared channel (PDSCH);

a step of using, in the RRC idle state or the RRC inactive state, the first resource for the reference signal for tracking, the first resource being configured based on the first configuration information; and a step of controlling, in the RRC connected state, reception of the PDSCH based on the reference signal for tracking in the second resource configured based on the second configuration information such that the first resource configured based on the first configuration information is ignored, the PDSCH being scheduled by using the DCI.

12. The wireless communication method according to claim 11, further comprising, in the RRC idle state or the RRC inactive state, a step of receiving a configuration for configuring a period for indicating an availability of the reference signal for tracking, and a step of receiving on the PDCCH, the DCI including information for indicating the availability of the reference signal for tracking in the first resource during the period.

13. The wireless communication method according to claim 12, wherein Cyclic Redundancy Check (CRC) scrambled by a Paging-radio network temporary identifier (P-RNTI) is attached to the DCI including the information for indicating the availability of the reference signal for tracking.

14. The wireless communication method according to claim 13, wherein a paging early indication is included in the DCI including the information for indicating the availability of the reference signal for tracking.

15. The wireless communication method according to claim 12, wherein a paging early indication is included in the DCI including the information for indicating the availability of the reference signal for tracking.

* * * * *